US012737809B2

(12) United States Patent
Walser

(10) Patent No.: US 12,737,809 B2
(45) **Date of Patent: *Sep. 15, 2026**

(54) CRYPTOCURRENCY-CASH GATEWAY

(71) Applicant: Joachim Paul Walser, Munich (DE)

(72) Inventor: Joachim Paul Walser, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/055,297

(22) Filed: Feb. 17, 2025

(65) Prior Publication Data

US 2025/0191066 A1 Jun. 12, 2025

Related U.S. Application Data

(62) Division of application No. 17/075,598, filed on Oct. 20, 2020, now Pat. No. 12,229,826.

(Continued)

(30) Foreign Application Priority Data

Mar. 2, 2020 (EP) .................................... 20160521

(51) Int. Cl.

*G06Q 40/04* (2012.01)
*G06F 9/54* (2006.01)

(Continued)

(52) U.S. Cl.

CPC ............. *G06Q 40/04* (2013.01); *G06F 9/547* (2013.01); *G06Q 10/10* (2013.01); *G06Q 20/027* (2013.01);

(Continued)

(58) Field of Classification Search

CPC ..... G06Q 40/00–128; G06Q 10/00–30; G06Q 20/00–425; G06Q 2220/00–18;

(Continued)

(56) References Cited

U.S. PATENT DOCUMENTS

| | | | | |
|---|---|---|---|---|
| 10,055,715 | B1 * | 8/2018 | Grassadonia .......... | G06Q 20/06 |
| 10,332,205 | B1 | 6/2019 | Russell et al. | |

(Continued)

FOREIGN PATENT DOCUMENTS

| | | | |
|---|---|---|---|
| EP | 2797058 | A1 | 10/2014 |
| GB | 2566591 | A | 3/2019 |

(Continued)

OTHER PUBLICATIONS

Roberts, "Banks testing tech to spped up transactions", Sep. 7, 2015, XPo55716701, Retrieved from the Internet: URL:read:https://www.charlotteobserver.com/news/business/banking/bank-watch-blog/article34289145.html [retrieved on Jul. 21, 2020] (4 pages).

(Continued)

*Primary Examiner* — Chenyuh Kuo
(74) *Attorney, Agent, or Firm* — David W. Carstens; James H. Ortega; Carstens, Allen & Gourley, LLP

(57) ABSTRACT

The present invention concerns a cryptocurrency-cash gateway, comprising a wallet interface for communicating over a network with at least one crypto wallet and an EFT gateway interface (404) for communicating over a network with at least one electronic funds transfer (EFT) gateway or financial institution, wherein the cryptocurrency-cash gateway is operable to perform a cryptocurrency-to-cash transaction for allowing a user to withdraw cash at an automated transaction machine (ATM) or a point-of-sale (POS) system by exchanging a corresponding amount of a cryptocurrency from the crypto wallet(s); or conversely allowing the user to deposit cash at an ATM or POS system and exchanging it for a corresponding amount of a cryptocurrency to be deposited in at least one crypto wallet of the user.

18 Claims, 7 Drawing Sheets

Related U.S. Application Data

(60) Provisional application No. 62/924,007, filed on Oct. 21, 2019.

(51) Int. Cl.

| | |
|---|---|
| ***G06Q 10/10*** | (2023.01) |
| ***G06Q 20/02*** | (2012.01) |
| ***G06Q 20/06*** | (2012.01) |
| ***G06Q 20/10*** | (2012.01) |
| ***G06Q 20/20*** | (2012.01) |
| ***G06Q 20/36*** | (2012.01) |
| ***G06Q 20/38*** | (2012.01) |
| ***G06Q 40/02*** | (2023.01) |
| ***H04L 9/14*** | (2006.01) |

(52) U.S. Cl.

CPC ..... *G06Q 20/0655* (2013.01); *G06Q 20/1085* (2013.01); *G06Q 20/202* (2013.01); *G06Q 20/3672* (2013.01); *G06Q 20/3674* (2013.01); *G06Q 20/3678* (2013.01); *G06Q 20/381* (2013.01); *G06Q 20/3825* (2013.01); *G06Q 20/3829* (2013.01); *G06Q 40/02* (2013.01); *H04L 9/14* (2013.01); *G06Q 2220/00* (2013.01); *H04L 2209/56* (2013.01)

(58) Field of Classification Search

CPC ......... G06F 9/00–4893; H04L 9/00–50; H04L 2209/00–88

See application file for complete search history.

(56) References Cited

U.S. PATENT DOCUMENTS

| | | | | |
|---|---|---|---|---|
| 10,373,148 | B1 | 8/2019 | Dixon et al. | |
| 10,510,053 | B2 | 12/2019 | Armstrong | |
| 11,019,055 | B1 * | 5/2021 | Rose | H04L 63/0823 |
| 11,037,114 | B2 * | 6/2021 | Kuchenski | G06Q 20/3223 |
| 11,257,050 | B2 * | 2/2022 | Asver | G06Q 20/3676 |
| 11,367,056 | B2 * | 6/2022 | Friedlander | G06Q 20/18 |
| 11,715,084 | B1 * | 8/2023 | Dixon | G06Q 20/22 705/44 |
| 2006/0022032 | A1 * | 2/2006 | Fillinger | G06Q 40/02 235/379 |
| 2016/0203477 | A1 * | 7/2016 | Yang | G06Q 20/3829 705/69 |
| 2017/0053284 | A1 * | 2/2017 | Votaw | G06Q 20/3278 |
| 2017/0262824 | A1 * | 9/2017 | Singh | G06Q 20/381 |
| 2018/0047000 | A1 | 2/2018 | Kuchenski et al. | |
| 2018/0165663 | A1 * | 6/2018 | Naik | G06Q 20/3223 |
| 2019/0012466 | A1 | 1/2019 | Ricotta et al. | |
| 2019/0034889 | A1 | 1/2019 | Brock et al. | |
| 2019/0108542 | A1 * | 4/2019 | Durvasula | G06Q 20/3829 |
| 2019/0139033 | A1 * | 5/2019 | Ricotta | G06Q 20/1085 |
| 2019/0236561 | A1 | 8/2019 | Hamilton et al. | |
| 2019/0236593 | A1 * | 8/2019 | Vorobyev | G06Q 20/3829 |
| 2019/0259025 | A1 | 8/2019 | Hilton et al. | |
| 2019/0318326 | A1 * | 10/2019 | Russell | G06Q 20/3276 |
| 2022/0084011 | A1 * | 3/2022 | Jamkhedkar | G06Q 20/1085 |

FOREIGN PATENT DOCUMENTS

| | | | | |
|---|---|---|---|---|
| WO | 2018189597 A1 | | 10/2018 | |
| WO | WO-2020104961 A1 | * | 5/2020 | G06Q 20/065 |

OTHER PUBLICATIONS

Satoshi Nakamoto, "Bitcoin: A Peer-to-Peer Electronic Cash System" (https://bitcoin.org/bitcoin.pdf) (9 pages).

Wood, G., Antonopoulos A.M. (2018) "Mastering Ethereum", O'Reilly Media, Inc.

* cited by examiner

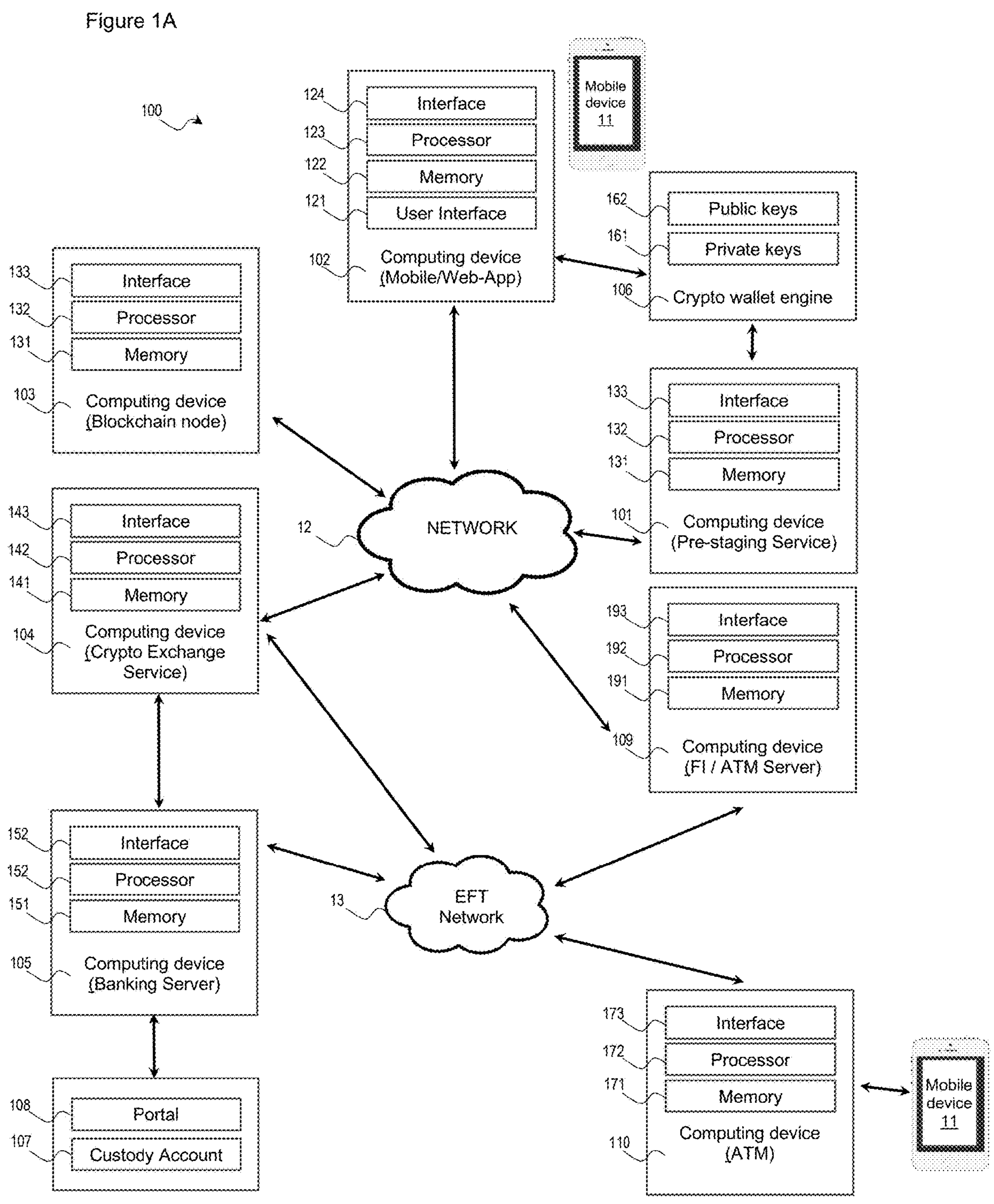

Figure 1A
100
124
Interface
123
Processor
122
Memory
121
User Interface
102
Computing device
(Mobile/Web-App)
Mobile
device
11
162
Public keys
161
Private keys
106
Crypto wallet engine
133
Interface
132
Processor
131
Memory
103
Computing device
(Blockchain node)
133
Interface
132
Processor
131
Memory
101
Computing device
(Pre-staging Service)
143
Interface
142
Processor
141
Memory
104
Computing device
(Crypto Exchange
Service)
12
NETWORK
193
Interface
192
Processor
191
Memory
109
Computing device
(FI / ATM Server)
152
Interface
152
Processor
151
Memory
105
Computing device
(Banking Server)
13
EFT
Network
173
Interface
172
Processor
171
Memory
110
Computing device
(ATM)
Mobile
device
11
108
Portal
107
Custody Account

Figure 1B:
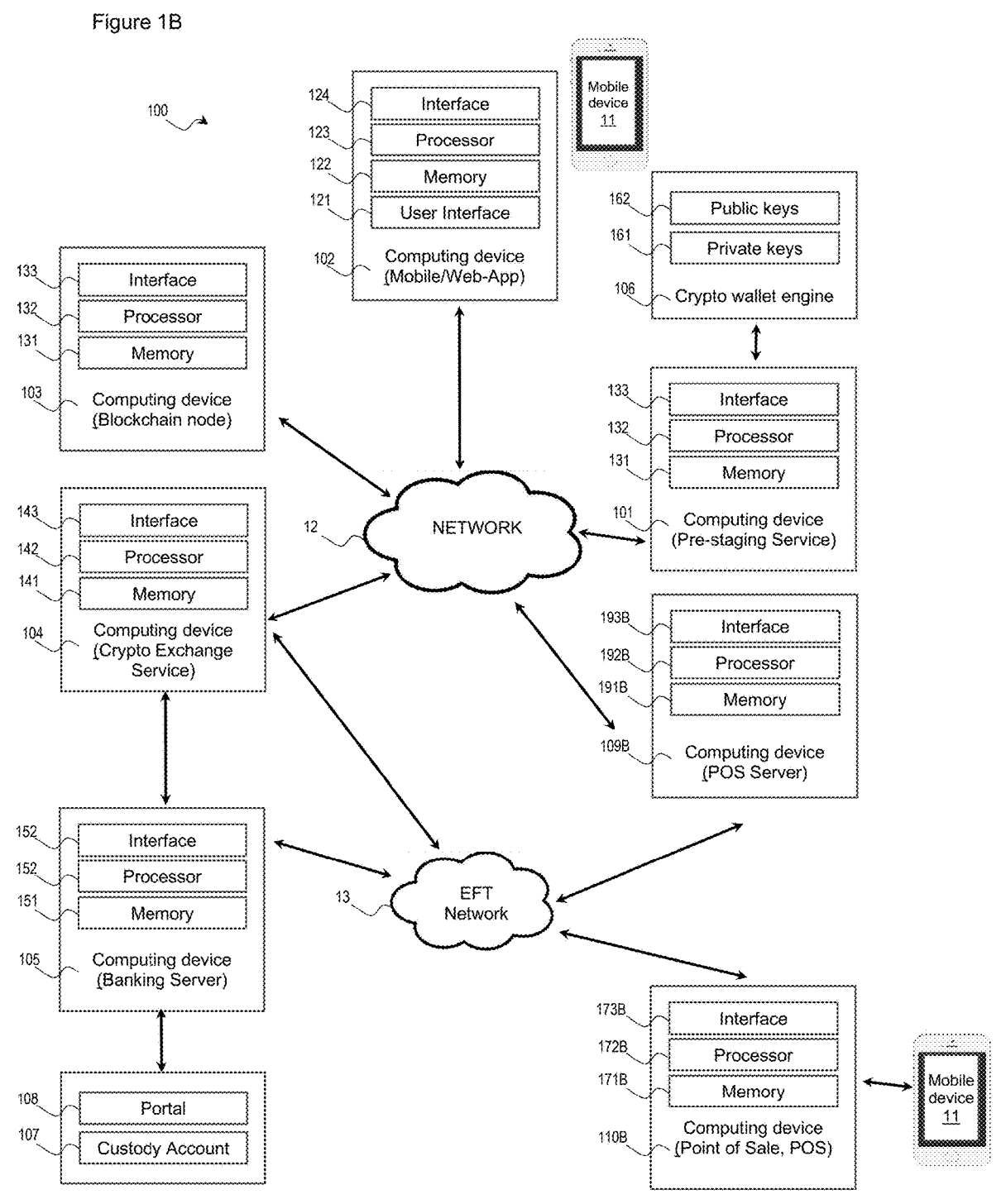

124 Interface
123 Processor
122 Memory
121 User Interface
102 Computing device (Mobile/Web-App)

Mobile device 11

162 Public keys
161 Private keys
106 Crypto wallet engine

133 Interface
132 Processor
131 Memory
103 Computing device (Blockchain node)

133 Interface
132 Processor
131 Memory
101 Computing device (Pre-staging Service)

12 NETWORK

143 Interface
142 Processor
141 Memory
104 Computing device (Crypto Exchange Service)

193B Interface
192B Processor
191B Memory
109B Computing device (POS Server)

152 Interface
152 Processor
151 Memory
105 Computing device (Banking Server)

13 EFT Network

108 Portal
107 Custody Account

173B Interface
172B Processor
171B Memory
110B Computing device (Point of Sale, POS)

Mobile device 11

Figure 2

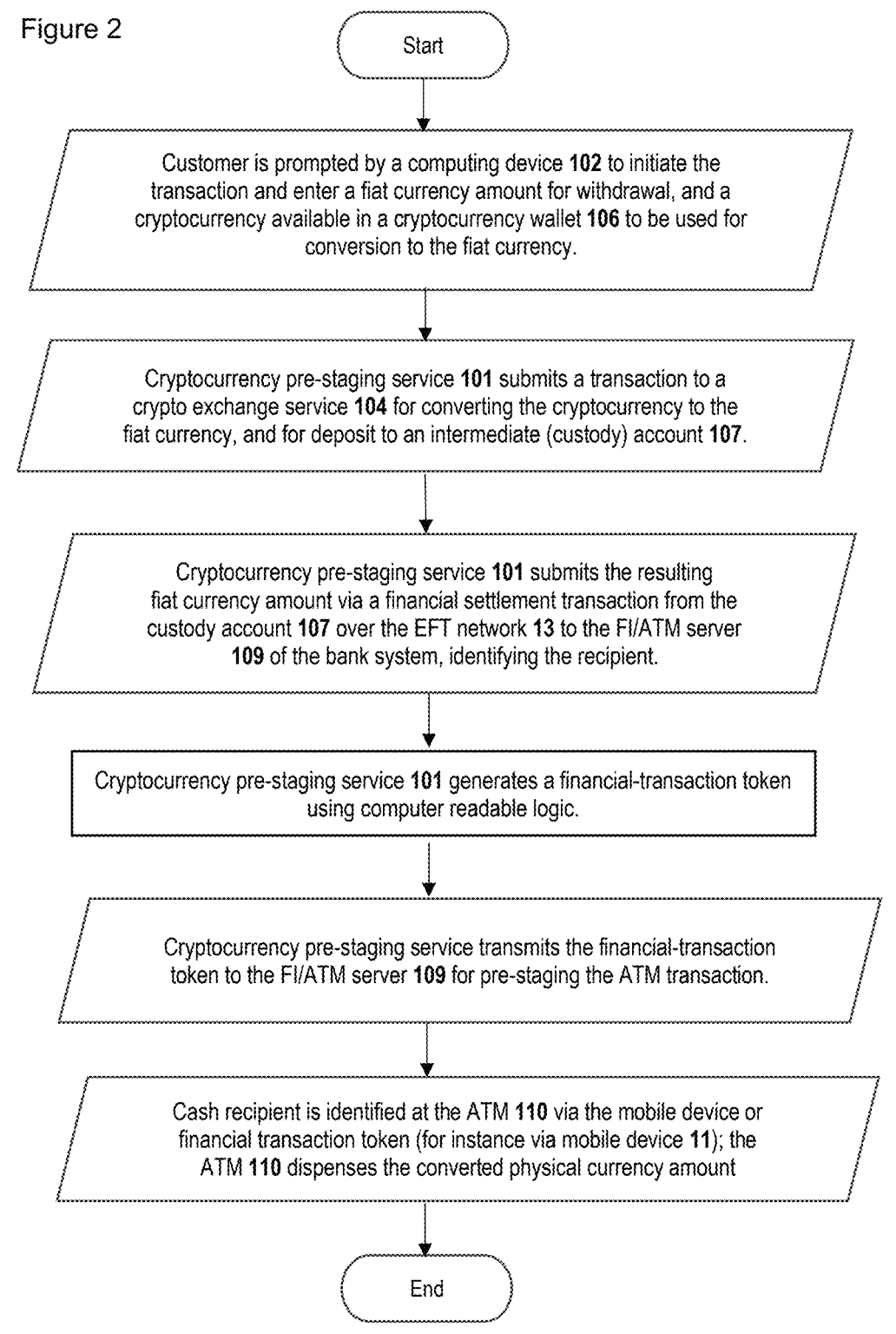

Start

Customer is prompted by a computing device 102 to initiate the transaction and enter a fiat currency amount for withdrawal, and a cryptocurrency available in a cryptocurrency wallet 106 to be used for conversion to the fiat currency.

Cryptocurrency pre-staging service 101 submits a transaction to a crypto exchange service 104 for converting the cryptocurrency to the fiat currency, and for deposit to an intermediate (custody) account 107.

Cryptocurrency pre-staging service 101 submits the resulting fiat currency amount via a financial settlement transaction from the custody account 107 over the EFT network 13 to the FI/ATM server 109 of the bank system, identifying the recipient.

Cryptocurrency pre-staging service 101 generates a financial-transaction token using computer readable logic.

Cryptocurrency pre-staging service transmits the financial-transaction token to the FI/ATM server 109 for pre-staging the ATM transaction.

Cash recipient is identified at the ATM 110 via the mobile device or financial transaction token (for instance via mobile device 11); the ATM 110 dispenses the converted physical currency amount End

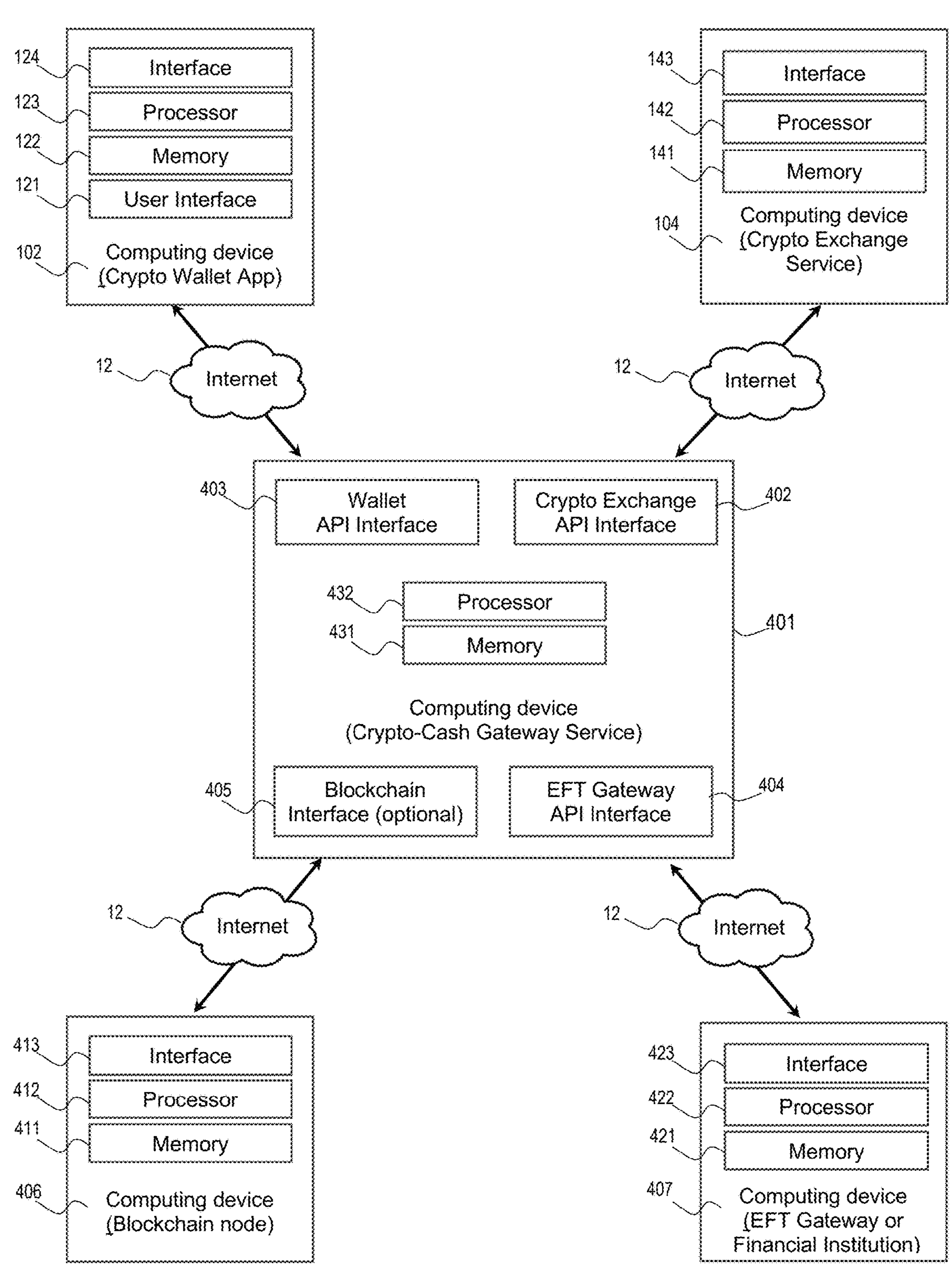
Figure 4
124
Interface
123
Processor
122
Memory
121
User Interface
102
Computing device
(Crypto Wallet App)
143
Interface
142
Processor
141
Memory
104
Computing device
(Crypto Exchange
Service)
12
Internet
12
Internet
403
Wallet
API Interface
Crypto Exchange
API Interface
402
432
Processor
431
Memory
401
Computing device
(Crypto-Cash Gateway Service)
405
Blockchain
Interface (optional)
EFT Gateway
API Interface
404
12
Internet
12
Internet
413
Interface
412
Processor
411
Memory
406
Computing device
(Blockchain node)
423
Interface
422
Processor
421
Memory
407
Computing device
(EFT Gateway or
Financial Institution)

Figure 6

| | | | | |
|---|---|---|---|---|
| | | ATM | AT | |
| Open mobile app crypto wallet, select pre-order cash from cryptocurrency | Select crypto-currency to exchange (sell) and amount in fiat currency to retrieve. Select bank network | At ATM request QR Code: Select cardless cash on the menue of an ATM to display a tokenized QR code on screen | Tap the cardless cash option within the bank's mobile app to invoke QR scanner, scan ATM's QR Code | Collect Cash: Retrieve pre-staged transaction cash, as previously exchanged |
| 601 | 602 | 603 | 604 | 605 |

CRYPTOCURRENCY-CASH GATEWAY

CROSS-REFERENCE TO RELATED APPLICATIONS

This application is a divisional of U.S. patent application Ser. No. 17/075,598, filed Oct. 20, 2020, now U.S. Pat. No. 12,229,826, which claims priority to U.S. Provisional Application Ser. No. 62/924,007, filed Oct. 21, 2019, and also claims the benefit of and priority to European Application No. EP20160521.9, filed Mar. 2, 2020. The entire contents of each application are hereby incorporated by reference in their entireties for all purposes.

TECHNICAL FIELD

The present application generally relates to the field of financial technology ("FinTech") and more particularly to technologies for conducting cryptocurrency-to/from-cash transactions.

BACKGROUND

This invention, in some embodiments thereof, relates in general to a currency transaction gateway system connected to a cryptocurrency wallet and to systems for financial transactions on blockchain systems. A cryptocurrency is a digital asset that is designed to work as a medium of exchange and that uses cryptography to secure financial transactions and transfer of assets. There are many different cryptocurrencies in use already and adoption is increasing fast.

Cryptocurrency, referred to as a form of virtual currency, is a digital asset designed to work as a medium of exchange that uses distributed ledger technology (DLT), typically embodied in the form of a blockchain, to secure its transactions, to control the creation of additional units, and to verify the transfer of assets. Cryptocurrency funds are typically stored in a digital cryptocurrency wallet that is cryptographically secured, which will be referred to as crypto wallet herein. Cryptocurrencies contrast with classic central bank money (fiat currency), which is currency in the form of either legal physical notes or coins or electronic funds provided by central banks to financial institutions (banks). Collectively, all virtual currencies are herein referred to as cryptocurrencies.

Cryptocurrency, based on blockchain technology, described in a 2008 article by Satoshi Nakamoto, called "Bitcoin: A Peer-to-Peer Electronic Cash System" (https://bitcoin.org/bitcoin.pdf), is a continuously growing list of records, called blocks, which are linked and secured using cryptography. The blockchain is a data structure that stores a list of transactions and may be thought of as a distributed electronic ledger that records transactions. The transactions are bundled into blocks and every block (except for the first block) refers back to or is linked to a prior block in the chain. Computer nodes maintain the blockchain and cryptographically validate each new block and thus the transactions contained in the corresponding block.

In addition, this invention, in some embodiments thereof, relates to systems for providing financial services and transactions. These systems may generally include certain standalone machines, for one example the Automated Transaction Machine (ATM). The ATM category includes machines capable of conducting different traditional banking transactions, including withdrawal/dispensing of cash, and/or acceptance of cash, also referred to herein as physical (fiat) currency, or notes/coins. Another category is point-of-sale (POS) systems, which include cashier systems conducting acceptance of payments or dispensing of currency, for example cashier systems handling POS transactions and managing cash funds for retail automation.

U.S. Patent Pub. No. U.S. 2018/0047000, filed Jun. 19, 2017, entitled "Token Based Transactions" discloses a method for pre-staging ATM transactions that permits a banking customer to either transfer money to a third party or to themselves. In particular embodiments, a token is generated that can be used multiple times by the recipient.

U.S. Patent Pub. No. U.S. 2019/0236593, filed Dec. 21, 2018, entitled "Cryptocurrency Conversion" discloses a system that allows an amount of a cryptocurrency to be transferred to a decentralized electronic ledger and an amount of another cryptocurrency to be transferred to another decentralized electronic ledger using cryptographic keys. A sequence of exchange operations is selected by which the cryptocurrency is exchanged for fiat currency, which include an entry into the decentralized electronic ledger requiring a cryptographic signature using the cryptographic keys and another entry into the other decentralized electronic ledger requiring another cryptographic signature using other cryptographic keys.

U.S. Patent Pub. No. U.S. 2019/0259025, filed Feb. 19, 2019, entitled "System and Method for Performing Transactions with Exchangeable Cryptocurrency and Legal Tender Currency" discloses a method for performing transactions with exchangeable cryptocurrency and legal tender, and more particularly a method that utilizes a complementary legal tender currency subsystem for operating a banking module, a vaulting module, a legal tender fund module that has accounting information for complementary legal tender, a cache fund module, a crypto-currency module that has accounting information for virtual monetary tokens, a crypto-shares module that has accounting information for virtual share tokens, an escrow fund module, a trust fund module, a payment processing module, banking module, and vaulting module.

U.S. Pat. No. 10,510,053, filed Dec. 17, 2019, entitled "Send Cryptographic Currency to Email Address" discloses a method for sending Bitcoin to an email address. No miner's fee is paid by a host computer system. Hot wallet functionality is provided that transfers values of some Bitcoin addresses to a vault for purposes of security. A private key of a Bitcoin address of the vault is split and distributed to keep the vault secure. Instant exchange allows for merchants and customers to lock in a local currency price.

U.S. Patent Pub. No. U.S. 2019/0034889, filed Jan. 31, 2019, entitled "Cryptocurrency Payment Network" discloses a method including receiving a request for payment associated with a transaction between a first user and a second user, where the request specifies a payment amount in a fiat currency and identifying an indication that the first user intends to satisfy the request for payment using a non-fiat instrument. The method also includes initiating a first transfer of a value corresponding to the payment amount in the non-fiat instrument from a first balance of the first user to one or more service balances of a payment service, and initiating a second transfer of a value corresponding to the payment amount in the fiat currency from the one or more service balances of the payment service to a second balance of the second user.

Additional technological background information may be found in Antonopoulos A. M. (2014), "Mastering Bitcoin:

Programming the Open Blockchain", and Wood, G., Antonopoulos A. M. (2018) "Mastering Ethereum", O'Reilly Media, Inc.

An important limitation in the use of many cryptocurrencies as a medium of exchange is that transferring cryptocurrency payments on a distributed ledger (usually a blockchain) and settling the transaction is non-instant and requires time—for example, Bitcoin takes on average 10 minutes for settling a transaction on the next block of the blockchain. A further limitation when exchanging cryptocurrency funds for fiat currency is that usually an exchange service needs to be invoked, and the fiat currency funds need to be electronically deposited in a bank account of the receiver. Finally, in order to be able to withdraw physical notes or coins of cash at an ATM or POS system, the funds may need to be transferred to a different bank account via an electronic-funds-transfer (EFT) system, from which they may be retrieved via the ATM or POS system.

Overall, the process of converting cryptocurrency available in a crypto wallet (for example, on a mobile device or at a cryptocurrency custody provider accessed through a mobile app or web portal) to physical cash of fiat currency at an ATM or POS system requires many steps, each step requiring time for authorization and settlement, and overall involving numerous systems—for example crypto wallet apps and/or servers, crypto exchange services, EFT networks connecting participating financial institutions (FIs), and/or credit card providers. The resulting complexity entails long processing times (hours or sometimes days) and/or substantial fees in the present state of the art, which can make it impractical to exchange available cryptocurrency funds in a crypto wallet to fiat currency cash, especially for smaller transactions.

The same aforementioned limitations exist in the inverse direction, when depositing fiat currency cash at a deposit ATM, cash recycler, or POS system and transferring it to exchange it for cryptocurrency, and deposit it in a crypto wallet via a distributed ledger, many transactions are required from the ATM's account to the recipient FI to the crypto exchange, to finally record the transaction with the receiver's crypto wallet address via the distributed ledger.

U.S. 2019/139033 discloses systems and methods for moving money from a crypto currency to a fiat currency in real-time using a mobile wallet or debit card to allow a customer to use the funds instantly. The process for such movement of money is secured using distributed ledger technology and smart contract services.

WO 2018/189597 discloses a transactions processor device for securely executing transfer of value or money between holders of mobile subscriber accounts, common banking agent and a virtual bank account.

EP 2 797 058 A1 discloses a system and method for electronic money withdrawal which is implemented by a transfer of electronic money from the user electronic wallet to a money distribution authority, typically a bank.

U.S. 2019/236561 discloses a POS terminal configured to process government-backed currency transactions as well as cryptocurrency purchase and sell transactions.

The present invention has been developed to address the aforementioned complexities and limitations of the present state of the art, to provide a system and method that utilizes a cryptocurrency-cash gateway, performing the exchange between cryptocurrency and fiat currency cash in a more efficient and seamless manner.

SUMMARY

The invention provides a solution for the aforementioned problems in one embodiment by a cryptocurrency-cash gateway. The gateway may comprise a wallet interface for communicating over a network with at least one crypto wallet. The gateway may further comprise an EFT gateway interface for communicating over a network with at least one EFT gateway or financial institution. In some embodiments, the cryptocurrency-cash gateway is operable to perform a cryptocurrency-to-cash transaction for allowing a user to withdraw cash at an ATM or a POS system by selling a corresponding amount of a cryptocurrency.

Accordingly, this technology enables cryptocurrency holders to retrieve cash at an ATM or POS system, by automatically exchanging cryptocurrency available in a crypto wallet to fiat currency and providing the fiat currency in the form of physical cash. An alternative aspect of the invention enables depositing cash at an ATM or POS system and automatically exchanging it for a cryptocurrency with the corresponding amount deposited to a crypto wallet.

The performing of the cryptocurrency-to-cash transaction may comprise pre-staging the cryptocurrency-to-cash transaction.

As cryptocurrencies are known to be associated with long transaction times for settling transactions (usually on a distributed ledger), this aspect of the invention allows for pre-processing the transaction and preparing for instant cash retrieval at an ATM or POS system.

Such pre-staging may comprise receiving an indication of a fiat currency amount for withdrawal and a cryptocurrency from at least one crypto wallet to cover the fiat currency amount. It may also comprise transmitting, preferably via a crypto exchange interface (402) of the cryptocurrency-cash gateway, a transaction to at least one crypto exchange service to convert the cryptocurrency into the fiat currency, and for depositing the fiat currency amount into an intermediate account (107), or alternatively transmitting, preferably via a blockchain interface (405) of the cryptocurrency-cash gateway, a transaction signed by at least one crypto wallet (106) and committed to at least one blockchain node (103) to transmit the cryptocurrency to a recipient address of the cryptocurrency-cash gateway, and for depositing the fiat currency amount into an intermediate account (107). It may further comprise, after the fiat currency amount has been deposited in the intermediate account, making the fiat currency amount from the intermediate account available for withdrawal at the ATM or POS system.

Accordingly, this aspect of the invention automates the complex conversion process from cryptocurrencies to physical cash and allows for pre-staging the required transactions of exchanging cryptocurrency and sending the funds over an EFT network via a gateway service.

Making the fiat currency amount available for withdrawal may comprise generating a financial transaction token and providing the financial transaction token via the EFT gateway interface.

Accordingly, this aspect of the present technology enables the identification of the invoked transaction at the ATM or POS system. As used herein, this may enable the user to identify the ATM or POS system for the actual cash retrieval via a QR-code or near-field communication (NFC) between a mobile device and an ATM or POS system device.

Alternatively or in addition, performing the cryptocurrency-to-cash transaction may comprise receiving an indication of a fiat currency amount for withdrawal and a cryptocurrency to cover the fiat currency amount, transmitting, preferably via a crypto exchange interface (402) of the cryptocurrency-cash gateway, a transaction to at least one crypto exchange service to convert the cryptocurrency into the fiat currency amount and for depositing the fiat currency amount into an intermediate account, and making the fiat currency amount from the intermediate account available for withdrawal at the ATM and/or POS system without delaying the transaction until the fiat currency amount is deposited in the intermediate account.

As used herein, this alternative aspect of the invention may enable for fast transactions without the need for pre-staging, for example, for cryptocurrencies transacted on faster ledgers (such as, for example, the Stellar blockchain, or a digital central bank electronic money ledger); or may involve a crypto wallet provided by the cryptocurrency-cash gateway holding cryptocurrency on behalf of the customer that may be decreased by the gateway service after the actual cash withdrawal; or may enable cash transactions of customers that have an authorized credit limit with the cryptocurrency-cash gateway service.

The cryptocurrency-cash gateway may also comprise a blockchain interface for communicating over a network with at least one blockchain node.

Accordingly, this aspect of the invention may carry the advantage of processing the cryptocurrency transaction for specific blockchains without the need of invoking an external cryptocurrency exchange service that may involve additional exchange fees.

The wallet interface, the crypto exchange interface, the EFT gateway interface and/or the blockchain interface may comprise at least one application programming interface (API).

Accordingly, this aspect of the present technology may provide the service through APIs to facilitate integration with existing services, for instance for providers of crypto wallet services (such as crypto wallets on mobile devices or for providers of crypto custody services) as well as other APIs.

The cryptocurrency-cash gateway may be implemented as a service on a computing device and/or using one or more smart contracts on a distributed ledger system.

According to this implementation of the present subject matter, smart contracts may enable the use of the service in a distributed manner directly on a public blockchain, providing services for different market participants via a smart contract.

In another aspect of the invention, which may be provided independent of or in combination with the above-explained aspects, a cryptocurrency-cash gateway is provided, which comprises a wallet interface for communicating over a network with at least one crypto wallet and an EFT gateway interface for communicating over a network with at least one EFT gateway or financial institution. The cryptocurrency-cash gateway may in this aspect be operable to perform a cash-to-cryptocurrency transaction for allowing a user to deposit cash at an ATM or POS system and to deposit a corresponding amount of a cryptocurrency in a crypto wallet of the user.

The cryptocurrency-cash gateway according to the above aspect may perform the cash-to-cryptocurrency transaction by pre-staging the cash-to-cryptocurrency transaction.

The pre-staging of a cash-to-cryptocurrency transaction may be implemented by the cryptocurrency-cash gateway by receiving an indication of a fiat currency and fiat currency amount for deposit and a cryptocurrency to deposit in at least one crypto wallet (106); and after the physical fiat currency amount has been deposited at the ATM (110) or POS system (110B), depositing the fiat currency amount into an intermediate account (107) via an EFT gateway interface (404) or financial institution (407); and transmitting, preferably via a crypto exchange interface (402) of the cryptocurrency-cash gateway, a transaction to at least one crypto exchange service (104) to convert the fiat currency amount into the cryptocurrency amount; or transmitting, preferably via a blockchain interface (405) of the cryptocurrency-cash gateway, a transaction to at least one blockchain node (406); and transmitting the cryptocurrency amount to the recipient crypto wallet address (162).

Accordingly, this aspect of the present invention provides the advantage for the user of preparing the transaction prior to the deposit of physical cash, having already identified the particular cryptocurrency and wallet address for depositing the funds.

The cryptocurrency-cash gateway may use a wallet interface (403), a crypto exchange interface (402), an EFT gateway interface (404) and/or a blockchain interface (405) comprising one or more APIs.

Accordingly, this aspect of the present invention carries the advantage of being operable as an API service for other market participants.

The present invention also provides a method of operating any of the cryptocurrency-cash gateways described above. Lastly, a computer program is also provided comprising instructions for implementing the method.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

FIG. 1A shows an example flow diagram in an embodiment for pre-staging and executing a transaction, where a user-initiated ATM transaction is processed in a mobile app cryptocurrency wallet, exchanged via a cryptocurrency exchange, and transferred via an EFT network to an FI ATM server for withdrawal or deposit of physical fiat currency at the ATM.

FIG. 1B shows a flow diagram of an alternative embodiment where the user-initiated transaction is also processed in the mobile app crypto wallet, exchanged via a cryptocurrency exchange, and transferred via an EFT network to a POS server for withdrawal of physical fiat currency at a POS system, for example, in a retail shop; or alternatively physical currency to be deposited at a POS system with a corresponding cryptocurrency to be credited to a crypto wallet.

FIG. 2 is a flow diagram of an example transaction process by which the present inventive concept can be realized in one embodiment, showing how the recipient initiates a pre-staged financial transaction through a computing or mobile device in order to withdraw physical currency at an ATM.

FIG. 4 shows an example system architecture providing APIs for crypto wallet applications, crypto exchanges, EFT gateways or financial institutions, and/or cryptocurrency exchanges, optionally using a smart contract method to record the transaction states via distributed ledger on a blockchain node.

FIG. 6 shows an example of the steps for a customer to perform a pre-staged cryptocurrency-to-cash transaction.

DETAILED DESCRIPTION

Figure 3:
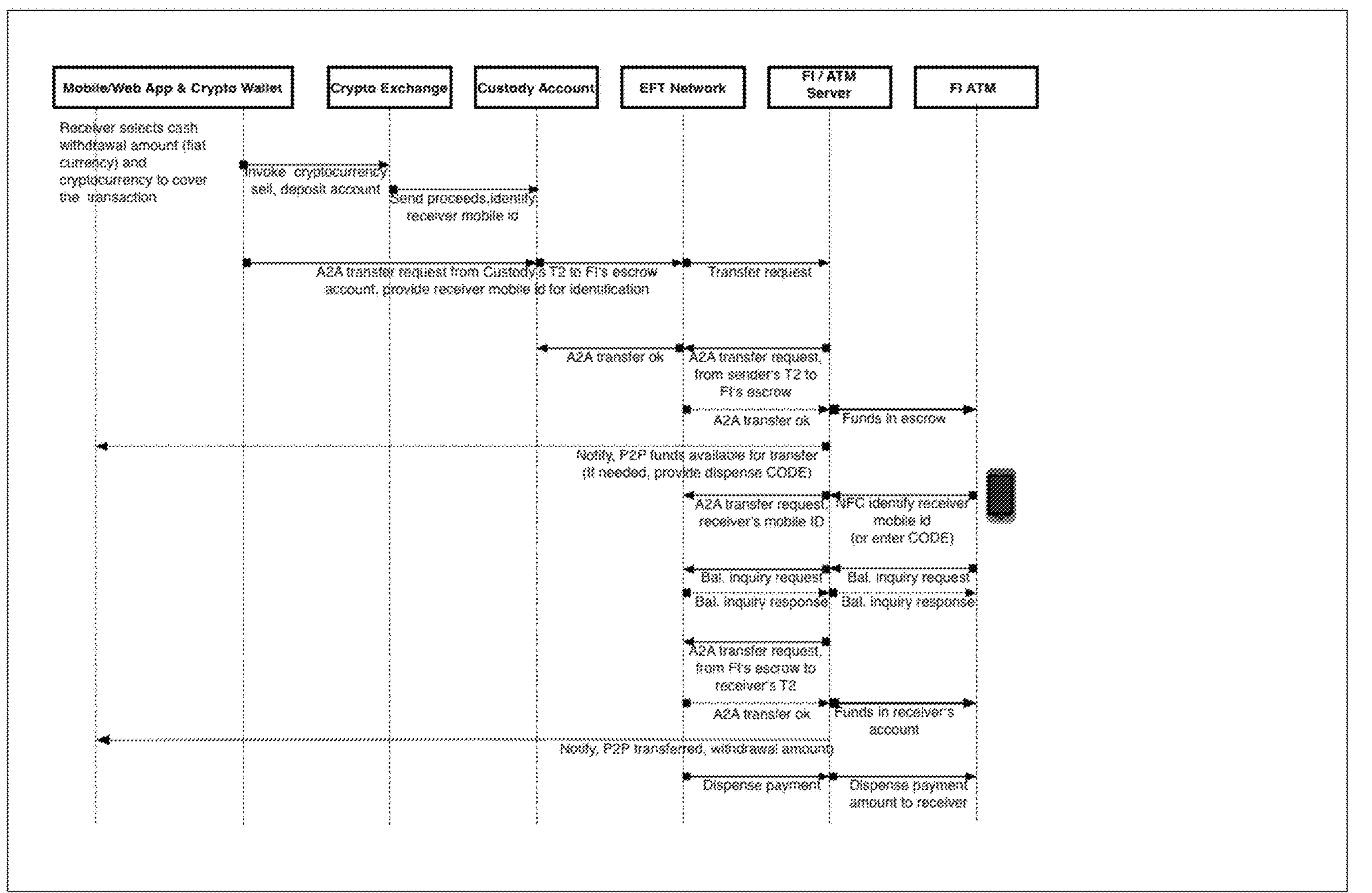
FIG. 3 shows an example method for the steps of pre-staging and executing a cryptocurrency transaction, followed by a pre-staging, initiating, and completing a financial fiat currency transaction between a sender, having a crypto wallet, and a receiver obtaining the dispensed fiat currency in accordance with an embodiment of the invention.

Embodiments of the disclosure will now be described. This invention, in some aspects, relates to a cryptocurrency wallet ("crypto wallet"), as a store of value and a system of exchange for financial transactions on blockchain systems, and to the conversion of such cryptocurrencies to cash or physical currency, by a sequence of one or several transactions, yielding the cash or physical currency, for example at an ATM system or a retail POS cashier system.

For example, the cash transactions may include a conversion of a particular cryptocurrency, for example, Bitcoin (Bitcoin Blockchain) or Ether (Ethereum Blockchain), or other cryptocurrencies pegged to individual fiat currencies, called stablecoins, such as, for example, USD Tether, Gemini Dollar, or central bank digital currencies CBDCs, or tokens pegged to a basket of fiat currencies and other assets. Such cryptocurrencies, which may be exchanged by specific crypto exchange services for a particular legal currency, such as U.S. Dollars or Euros, or other currencies that can be dispensed physically at an ATM or POS system. For particular examples, such cryptocurrencies, stablecoins or tokens, known to the skilled artisan, include cryptocurrencies in social messenger apps, or tokens exchanged on the Ethereum blockchain, following the ERC-20 (Ethereum Request for Comment), a technical standard used for smart contracts on the Ethereum blockchain for implementing tokens, or social network/messenger tokens.

One aspect of the invention enables a customer to initiate and pre-stage an ATM transaction based on a cryptocurrency wallet transaction, with the result to dispense a fixed amount of physical currency or cash to a receiver, wherein the pre-staged cash transaction can be carried out by the customer or a second party at the ATM, by identifying the user and/or ATM through a QR code, or inputting a token, e.g., an alphanumeric character string, into an ATM configured to receive it.

In another aspect, the pre-staged transaction can be executed by the first party at the ATM using a near-field-communication (NFC) mechanism in an electronic device such as a mobile phone or tablet.

In another aspect, the first party pre-stages an ATM transaction based on a given amount of cryptocurrency transaction from the crypto wallet, to dispense a variable amount of currency, dependent on the exchange-rate and fees that are charged by an intermediate exchange at the time when the transaction takes place.

This technology allows a customer (sender) to invoke a cryptocurrency transaction through the cryptocurrency-cash gateway by means of a cryptocurrency exchange service operating the corresponding blockchain, and subsequently via an automated transaction of an electronic funds transfer network (EFT Network) and yielding the physical currency at the ATM or POS system.

An important advantage of the present technology is that it overcomes a major disadvantage of cryptocurrency transactions on many public blockchains, which are known for long transaction times. In the case of Bitcoin, for example, a new block of transactions is recorded on the public ledger in intervals of about 10 minutes (with secured finality of the transaction consuming additional time, for further blocks recorded afterwards), which would render a cryptocurrency-to-cash transaction too time-consuming for final approval if it was initiated by a customer at an ATM or POS system. By pre-staging the blockchain transaction through a mobile or web application and processing it upfront, the present technology in one embodiment enables a ready-to-go cash withdrawal of the previously exchanged cryptocurrency funds at the ATM.

In another aspect of the invention, a cryptocurrency exchange service is invoked for an intermediate transaction, which trades the particular cryptocurrency or value token stored in the digital cryptocurrency wallet of the first party, to a digital cryptocurrency pegged to the target currency ("stablecoin"), that is designed to minimize the price volatility, relative to the target fiat currency (e.g., U.S. Dollars or Euros).

In another aspect, the system allows the customer to initiate/pre-stage a particular fixed amount in the target physical currency, e.g., "80 U.S. Dollars", and automatically invoke a blockchain transaction from the crypto wallet via an intermediate cryptocurrency exchange to a stablecoin value that is pegged to the target currency value to be withdrawn at the ATM, for example, the cryptocurrency USDC for U.S. Dollars. At the ATM, the transaction can then be executed with the amount of physical currency as initiated.

In another aspect, the system allows the customer to initiate/pre-stage a particular fixed amount deposit transaction, in the target physical currency to be deposited, e.g. "100 U.S. Dollars", and upon executing the pre-staged deposit transaction at the ATM, to automatically have the deposited physical currency value converted from a corresponding stablecoin to a target cryptocurrency stored in the electronic wallet, via an intermediate cryptocurrency exchange.

Another aspect of the present invention provides a method for enabling different market participants to exchange messages using several APIs, in order to enable different market systems to achieve the required steps of the cryptocurrency to fiat currency (cash) transaction, by providing APIs for mobile wallet systems, crypto exchange services, and financial institution systems or EFT networks such as NYCE, Visa or Mastercard, or Fintech payment providers providing access to such EFT networks. In this aspect, the transaction may directly be invoked by the customer at an ATM, and the invention enables the steps of routing the funds from a crypto wallet of the customer to the present ATM, without a pre-staging having taken place beforehand.

In another aspect of the invention, it relates to the conversion of cash or physical currency deposited at an ATM, to a cryptocurrency value, stored in a cryptocurrency wallet.

FIG. 1A is a schematic block diagram showing an example configuration of an overall system 100 in which aspects of the present invention can be embodied, and illustrates the key data transfers throughout the system 100. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention. References to the term "cryptocurrency" are sometimes abbreviated herein by the term crypto, which is used interchangeably. The term "device", as used herein, does not necessarily refer to a physical entity, i.e., a piece of hardware, but may be understood in a broader sense as a piece of functionality in the sense of a (software) service, as will be apparent from the context. Moreover, it will be appreciated that when a certain one of the many aspects of the invention is described as an “embodiment”, this does not mean that this “embodiment” would be technically distinct or even incompatible with other aspects also labelled “embodiments”. Rather, it will be understood by the person skilled in the art that the software- and/or computer-based nature of the invention allows all aspects described herein to be freely combined as feasible.

The present invention, which is applied in the domain of cryptocurrency, is necessarily rooted in computer technology in order to overcome a fundamental limitation of cryptocurrency, i.e., extracting cryptocurrency values from their representation in computer technology (for instance, on blockchains) into physical fiat currency or cash, and making this extraction a simple process for the recipient.

FIG. 1A illustrates a schematic block diagram of an example system 100 by which the present invention can be embodied. In summary, using the system 100 and techniques described herein, a user (recipient) may initiate a transaction on a computing device 102 (for example, a mobile device 11) for pre-staging an ATM withdrawal of a certain fiat currency amount from a bank, paid via one or more arbitrary cryptocurrencies which are available in a crypto wallet provided by a crypto wallet engine 106 (implemented either on a mobile device 11 or in another embodiment on an online server 101) and converted to fiat currency. In one embodiment, this first step of the transaction can be realized by means of invoking a crypto exchange service 104 to initiate a transfer of the cryptocurrency funds to a recipient address on the blockchain 103 in exchange for receiving fiat currency deposited in a bank account, for example, an intermediate or custody account 107 of the system 100 from the crypto exchange. The funds from the custody account 107 are then transmitted via an EFT network 13 to a bank account from where they can be made available for withdrawal by the recipient, for example, via an ATM 110. At the point of withdrawal 110, the recipient can be identified and authorized for the withdrawal in one embodiment through the use of a mobile device 11 (e.g., using near-field communication, or an optical code such as a QR code), or in another embodiment via a transaction code that was previously issued by pre-staging service 101.

Computing device 102, referred to herein as Mobile/Web-App, may be utilized by a client on a mobile device 11 such as a mobile phone or tablet, to interact with system 100, i.e., to request a currency transaction from a Financial Institution (FI) via an FI/ATM Server 109, to withdraw or deposit fiat currency (cash notes or coins) at a system comprising a computing device 110, which can, for example, be located within an ATM cash dispenser or deposit device (but is not limited to that), a cash recycling device (dispensing and accepting currency notes or coins), or alternatively other embodiments known to ones skilled in the art.

Computing device 102, may be realized as a system on a mobile device 11, and have control rendered in an app as part of the user interface 124 by which the customer can select first the amount of fiat currency and the desired denominations (notes or coins, e.g., “80 US$” in 4×20 US$ notes) to be withdrawn or otherwise received, followed by the customer selecting one or several of the cryptocurrencies available in the customer’s crypto wallet engine 106 to be sold in order to receive the requested amount of fiat currency via a trade or sell to be executed via the crypto exchange service 104.

One possible embodiment for computing device 102 is to implement a mobile or web app on a mobile device 11 or another computing device, and including a cryptocurrency wallet engine 106 holding securely encrypted private keys 161 for signing transactions and holding or generating public keys; other embodiments for computing device 102 include an implementation of a web app on a mobile device 11 or another computing device, which accesses a computing device 101 providing the pre-staging service. Either mobile app 102 or pre-staging service 101 access crypto wallet engine 106, which provides access to public and private keys of the user to access cryptocurrency funds. As is common in the field of cryptocurrency, a crypto wallet itself does not store the cryptocurrency itself, rather the cryptocurrency is stored on a distributed digital ledger, such as a blockchain, which holds the entries representing the cryptocurrency and the crypto wallet maintains the credentials (such as public keys 162 and, especially, private keys 161) that allow signing transactions for that ledger. In certain implementations, the crypto wallet is equipped with hardware and/or software mechanisms, e.g., wallet engine 106, by which transactions are cryptographically signed using the private key 161 of the crypto wallet. Additionally, wallet engine 106 may broadcast transactions over a network 12, connecting to a computing device 103 representing a node in the blockchain network. Upon review of this disclosure, those having skill in the art will recognize different techniques by which the functionality of a crypto wallet is fulfilled to embody the present invention.

In another embodiment, Mobile/Web-App device 102 may be a computer system such as a laptop or desktop computer system running a web-browser and sending messages to computing device 101, referred to herein as pre-staging service.

Computing device 101, referred to herein as pre-staging service, is instrumental to drive subsequent process steps and interact with computing device 104, referred to herein as crypto exchange server, computing device 105, referred to herein as banking server, and computing device 109, referred to herein as FI/ATM Server.

Computing device 104 may be operated by a cryptocurrency exchange where cryptocurrencies are traded for fiat currencies as well as for other cryptocurrencies. In certain embodiments, more than one exchange may be used—one for trading a cryptocurrency that is not directly convertible into a fiat currency and a second exchange for trading the latter cryptocurrency for fiat currency. Each of the exchange devices 104 may be associated with separate exchanges and may be accessed via a portal or API realized as part of the interface 133 from pre-staging service 101 to the API provided as interface 143.

Computing device 105 is operated by a financial institution to receive funds in fiat currency for the system 100 on behalf of the customer. Banking server 105 may provide a portal 108 to interact with the pre-staging service 101 to initiate a payment on behalf of the customer, through an EFT network 13, for a payment of the converted fiat currency to an account 107, referred to herein for exemplary purposes as an intermediate or custody account. In another embodiment, banking server 105 may receive payment in fiat currency on behalf of the customer through open banking portal (for example, but not limited to, an API following standards of payment services directive PSD2), known to the skilled artisan, with which the pre-staging service 101 communicates to provide a payment to account 107.

Computing device 109 receives a financial-transaction data set from pre-staging service 101 including customer-identification information from the customer that created the pre-staged financial transaction, and a financial transaction token.

Computing device 110 provides an access point for the customer, who is identified in one embodiment through a mobile device 11 or in an alternative embodiment through a financial transaction token, to receive the requested physical fiat currency (cash). Upon identification of the customer at the ATM, computing device 110 sends a request to computing device 109, via the EFT Network 13, to the FI/ATM server, to provide the information about a present pre-staged financial transaction. FI/ATM server 109 retrieves the financial-transaction data set, given the customer identification provided by ATM 110, and provides for transaction acceptance or rejection to ATM 110, and in the case of acceptance provides the financial transaction details to ATM 110, in particular the authorized fiat currency to be issued to the customer in terms of fiat currency notes (for example, "80 US$" in 4×20 US$ notes).

As an example for executing flows of FIG. 1A, depicted in FIG. 6 are the steps of a typical transaction: A customer may utilize mobile device 11 to access crypto wallet engine 106 via mobile app 102, and select pre-order cash from cryptocurrency (step 601). As shown in step 602, the customer may select a cryptocurrency (for example, Ether, ETH) available in the crypto wallet and a pre-ordered ATM withdrawal amount (for example, of 80 USD) at a bank (a financial institution) and/or ATM network. Crypto wallet engine 106 in turn may trigger the sale of the selected cryptocurrency using crypto exchange service 104, typically signing the transfer transaction of the available cryptocurrency to the crypto exchange service using the private keys stored in the crypto wallet. In the example, crypto wallet engine 106 may inform the pre-staging service 101 that the transaction was invoked (for example, via API 403), and pre-staging service 101 provides the identification of the custody account 107 (to be used for the proceeds in USD of the transaction) to crypto exchange service 104. Upon processing the exchange transaction, crypto exchange service 104 may inform pre-staging service 101 upon settlement of the transaction (for example, via API 402), and notify pre-staging service 101 about the availability of the funds. At this point, pre-staging service 101 may signal to the customer via mobile app 102 that the USD currency is ready for pickup at the chosen bank ATM network.

As shown in step 603, the customer may then walk up to ATM 110, and select the option to withdraw a pre-ordered cash transaction using the ATM system frontend, and ATM 110 may display a QR code to identify the ATM 110. As shown in step 604, the customer may invoke mobile app or banking app 102 to finalize the transaction, while pointing the camera of mobile device 11 at the ATM screen to scan ATM 110's QR code. At this point, pre-staging service 101 may invoke the EFT transaction to transfer the funds (80 USD) in custody account 107 from banking server 105 via FI/ATM Server 109 to ATM 110. Finally, in step 605, ATM 110 may dispense 80 USD to the customer and complete the transaction.

FIG. 1B shows another embodiment with similar components and flows, where, however, the fiat currency (cash notes or coins) is withdrawn or deposited at a system comprising a computing device 110B POS system, which is operated, for example, within a retail shop, a kiosk system, or an alternative outlet, and which is driven by a POS server 109B.

FIG. 2 is a flow diagram of one embodiment for pre-staging a cryptocurrency transaction, initiating and completing a pre-staged financial transaction between a sender of cryptocurrency, a crypto exchange and a receiver.

FIG. 3 illustrates one embodiment of the present technology, where a number of steps are described in detail for pre-staging and executing a cryptocurrency-to-cash transaction, relating to FIG. 1A. For the transaction, the customer is qualified as the "sender", and the currency recipient is qualified as the "receiver". The sender and the receiver may be either the same person, or in another embodiment it may be different persons. In general, in the flow diagram in FIG. 3 the beginning (filled box) of an arrow shows the origin of an act, event or data transfer, and the end point of the arrowhead shows the destination or receiving entity of the particular act, event or data transfer. Arrows consecutively beneath a first arrow represent the next and consecutive acts, events, or data transfers in the embodiment.

The temporal sequence of events shown in FIG. 3 begins with the sender selecting a currency and withdrawal amount (the fiat currency to withdraw funds in, for example, U.S. Dollars or Euros available in the network, and an amount, for example, 80 U.S. Dollars), followed by the sender selecting one of the cryptocurrencies available in the crypto wallet managed by the mobile or web application 102, to provide the required funds for the transaction to be executed through a cryptocurrency exchange 104.

The pre-staging service 101 checks if the available balance for conversion of the cryptocurrency to the fiat currency is sufficient and if so, then proceeds with exchanging (or selling) the cryptocurrency for the fiat currency, in one embodiment through a crypto exchange service 104. In one embodiment not presented in FIG. 3, this may involve an intermediate step of trading the available cryptocurrency to a stablecoin cryptocurrency and subsequently trading the stablecoin to the target currency. The subsequent steps have already been described in FIG. 1A, whereas FIG. 3 details one particular embodiment of the process steps to be carried out between the different components of the invention.

FIG. 4 illustrates an embodiment of the system architecture of the present invention with several components, providing a crypto-cash gateway service 401 as a method for different market participants to connect to the service via APIs providing a central system to carry out the required steps of the cryptocurrency-to-cash or cash-to-cryptocurrency transaction, as explained further above. In particular, these APIs may be provided, for example, for cryptocurrency or mobile wallet application systems 102, crypto exchange services 104, EFT Gateways or financial institutions 407. In one optional embodiment, the transaction may be represented and tracked on a public or private blockchain 500 accessed via a blockchain node 406 providing in one embodiment for a smart contract that is accessed through a blockchain interface 405 or other blockchain services, respectively, from the crypto-cash gateway service 401.

The APIs illustrated in FIG. 4 and in this description are for example purposes, and need not all be present in the method that realizes this inventive concept, as will be apparent to those of skill in the art in light of the disclosure herein.

Wallet API Interface 403 enables crypto wallet application systems or mobile banking apps to invoke a transaction for providing cryptocurrency available in the wallet through the crypto-cash gateway service 401 through the steps illustrated in FIG. 3, for example.

In one embodiment, the crypto cash gateway service 401 may invoke an API interface provided by a crypto exchange service 104 to invoke the actual blockchain transaction and receive the funds in a financial (fiat) currency account.

Alternatively, it may directly carry out the transaction and sell or buy the cryptocurrency through a blockchain node 406.

As used herein, in one embodiment, the method in FIG. 4 provides an EFT gateway API interface 404, as an interface to enable communication with EFT network providers, financial institutions and/or payment providers to interact with the crypto-cash gateway service 401. For example, a cryptocurrency-to-cash transaction may be invoked by a customer of a financial institution at an ATM through the process of the customer selecting a function "cash withdrawal from crypto wallet" through the ATM user frontend. This transaction is hence invoked from the FI/ATM Server 109 and subsequently carried out by the crypto-cash gateway service 401. In this embodiment shown in FIG. 4, through the EFT gateway API interface 404, the EFT Gateway 407 may initiate the required steps to carry out the transaction using the services provided by the crypto-cash gateway service 401. To provide the mobile app 11 with the link to the ATM identification for withdrawal of cash, for example, a QR code may be shown on the ATM display. The customer may scan the QR code of the ATM 110 using mobile device 11. In another embodiment, an NFC communication between the mobile app 11 and the ATM 110 may take place.

In the following, the mobile wallet application, having identified the ATM 110 via the QR code from which the "cash withdrawal from crypto wallet" transaction was just invoked, may refer to the transaction opened by the ATM server 109 through the crypto-cash gateway service 401 and provide the required steps, which are substantially similar to the steps shown in FIG. 3, except that the transaction in this case is not pre-staged but invoked directly at the ATM 110. In this embodiment, where the transaction is not pre-staged, the execution of the blockchain transaction to transfer the cryptocurrency may take some time for its settlement (for example, 10 minutes in a regular Bitcoin transaction). To enable the customer to retrieve the fiat currency cash at the ATM 110 before the blockchain transaction has completed the settlement, in one embodiment available funds from an intermediate fiat currency account accessible by the service may be used.

Relating to the methods shown in FIG. 1A and FIG. 4, it is understood by the skilled artisan that pre-staging service 101 and respectively crypto-cash gateway service 401 may charge a service fee or transaction fee for handling the transaction through the networks, which may be deducted from either the cryptocurrency or the fiat transaction, depending on the type of currency that funds the transaction. For instance, a service fee may be sent in cryptocurrency to the service fee account on the blockchain through blockchain node 103, respectively 406 in an additional blockchain transaction.

FIG. 4 illustrates an example of implementation of a crypto-cash gateway service 401, which may provide a central service that connects crypto wallet providers 102 (such as mobile apps or web wallet services such as Trust Wallet, Exodus wallet, or messenger wallets such as Keybase), crypto exchange services 104 (such as Coinbase, Binance, Gemini or Kraken) with EFT gateway providers 407 (e.g., NYCE, Visa® or Mastercard®, Paypal® or Wirecard®) or financial institutions (e.g., banks such as Citibank®, HSBC®, or national or regional banks), to offer a central cryptocurrency-to-cash exchange service for customers, enabled by standard APIs to connect the participating parties and carry out the required transactions across the different payment types from the centralized gateway service.

Figure 5:
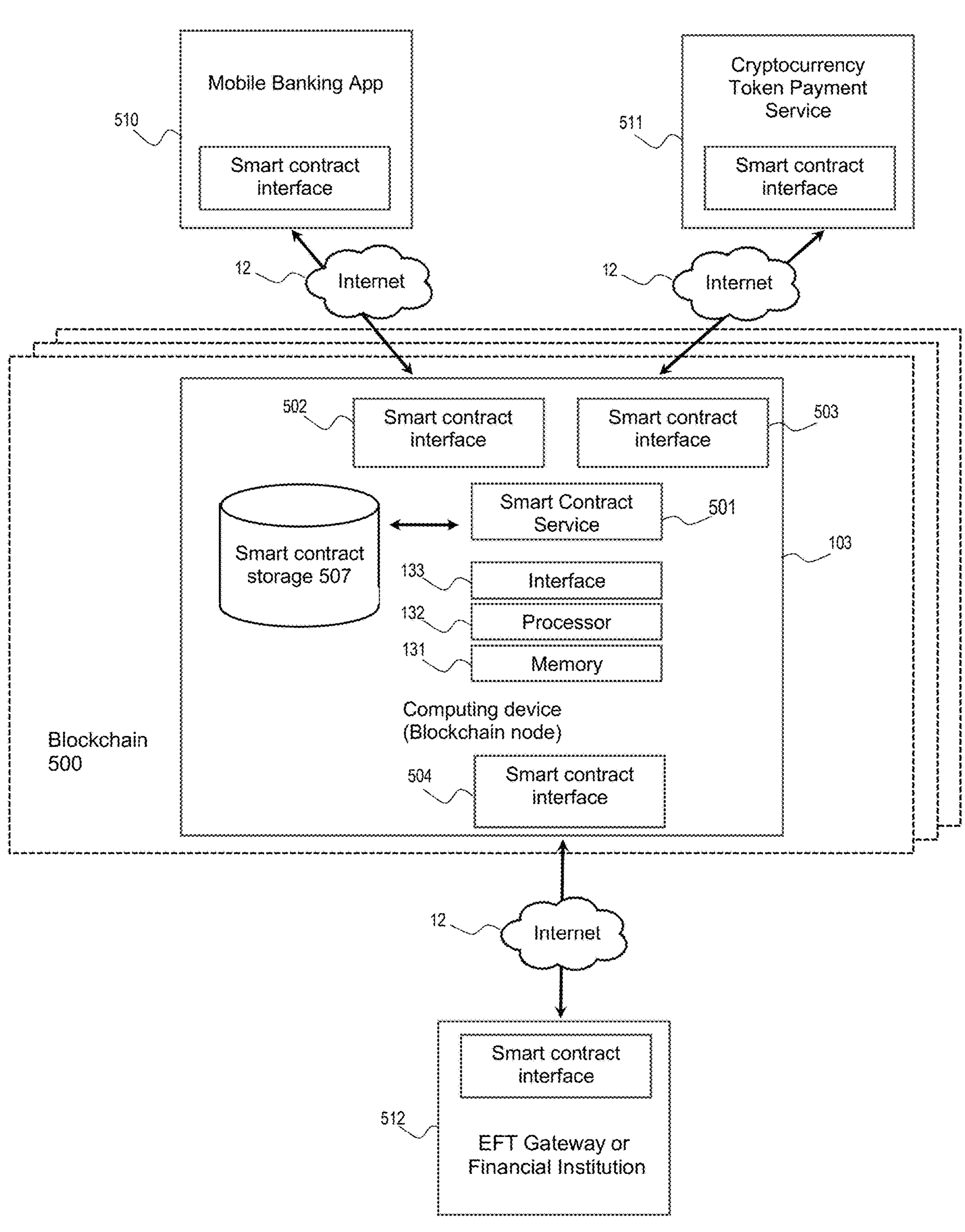
FIG. 5 shows an example method for a smart contract implementation embodiment to enable sharing transactional data and state information across different participating parties.

FIG. 5 illustrates an embodiment for the present technology using a smart contract service 501 rooted in a public distributed ledger technology (blockchain), such as, for example, the Ethereum blockchain. Beyond the setup shown in FIG. 4, this embodiment enables a decentralized method for providing a cryptocurrency cash gateway. One skilled in the art recognizes that this may be used as a way to track the status of the transaction on a public or private ledger, and further conforms to the paradigm of decentralized applications, which enables the method without a central server to drive the transactions and thereby avoids a single point of failure. In general, a smart contract is a computer program that is stored on the distributed ledger blockchain, for example, the public Ethereum blockchain infrastructure or a private or consortium blockchain infrastructure. The word "contract" in smart contract has no legal meaning in this context, but represents an executable computer program that may keep data stored and provide multiple methods or function to access, read and write the data. The smart contract (computer program) is compiled into bytecode for execution on the virtual machine, and will be executed simultaneously on many or all of the nodes of the blockchain in a deterministic way, so that all computers executing it will receive the same outcome, given the context of the transaction that initiated its execution and the state of the blockchain at the moment of execution.

Such smart contract service 501 may provide a service implemented on a blockchain 500, which may be a public blockchain or a private blockchain, for instance, available only to a consortium of private companies. Smart contract service 501 may be invoked by a so-called constructor, known to the skilled artisan to initiate a particular cryptocurrency-to/from-cash transaction. For the following steps pertaining to the transaction, smart contract service 501 provides methods that may be used for calls from various banking and payment provider systems 510, 511, 512 to carry out the individual steps of the overall end-to-end transaction. In order to allow for changes in the state of the transaction, the smart contract service 501 may provide several smart contract interfaces, for instance, 502, 503, 504, which may be implemented by methods or functions of the smart contract, as known to one skilled in the art.

Smart contract service 501 may subsequently receive messages to record the progress of the steps of the payment transactions across the different stages between cryptocurrency and payment systems and cash and keep track of the individual steps, as provided, for instance, in FIG. 3 with the purpose to enable the services to seamlessly work and record the steps of the cryptocurrency-to-cash transaction.

Smart contract service 501 subsequently may enable a mobile or web-app 102 to check for the status of the initiated transaction and allow the user who initiated the transaction to monitor the detailed progress. To this end, smart contract service 501 may store the state of the transaction for a particular account or address which invoked the service on the distributed ledger, i.e., within the computational nodes of the blockchain. Multiple invocations of the smart contract for different transactions are represented by multiple instances of the smart contract, similar to different object instances of a particular class in an object-oriented program, as known to anyone skilled in the art.

In one embodiment, the system allows for recording relevant data using the smart contract service 501 on the blockchain, operated in a plurality of nodes of the blockchain 500, represented in FIG. 5 by one particular node 103, which may record various status information items in smart contract storage 507, as given in the following examples:

A. If the Origin of the Transaction is a Cryptocurrency, and the Target is Fiat Currency Cash:

Transaction invocation, date and time, and details of the transaction, such as:

Transaction origin: original sender address, related to a particular origin wallet for a particular cryptocurrency (for example, Bitcoin, Ethereum, Litecoin, USDC, etc.) and its originating electronic public wallet address, Transaction destination, such as a destination bank identification or routing address, or ATM network identification, or POS system or network identification, possibly including a destination account identification and currency of the account (for example, USD or EUR).

Status of the cryptocurrency exchange transaction, such as:

Crypto exchange service invoked, service executed, exchange price settled, exchange fees incurred, or For a direct execution of exchanging via a blockchain node, the blockchain transaction status, such as submitting, pending, settled.

Settled on an intermediate or custody account, as applicable.

EFT transaction and status if the transaction is carried out through an EFT network, including EFT transaction status, invoked, pending, transaction settled, received at destination financial system.

Fiat currency availability for cash withdrawal at the target network, ATM or POS system.

Successfully retrieved, or to Revoke: in case not retrieved at destination in a given timeframe, in which case the funds need to be sent back to the original sender.

B. If the Origin of the Transaction is Fiat Currency Cash, and the Target is Crypto Currency:

Transaction invocation, date and time, and details of the transaction, such as:

Transaction origin, such as an origin bank identification, and upon deposit a corresponding ATM or POS system identification (for example, given through a QR code or an RFID), originating fiat account identification including the identification of a financial institution (for example, bank account and routing number, IBAN etc.) and currency of the account (for example, USD or EUR).

Transaction destination address, related to a particular destination cryptocurrency (for example, Bitcoin, Ethereum, Litecoin, USDC, etc.) and a destination electronic wallet address.

Status of readiness for deposit of the fiat currency at the ATM or POS system, respectively, after the successful deposit, a status of accepted, or rejected in case of mismatch.

EFT transaction and status if the transaction is carried out through an EFT network, including:

EFT transaction status, invoked, pending, transaction settled, received at destination custody account.

Status of the cryptocurrency exchange transaction, similar as A.2 above.

One exemplary embodiment of the invention relates to a system comprising:

a crypto wallet capable of storing a cryptocurrency;

a pre-staging computing device configured to interface with the crypto wallet with access to the cryptocurrency;

a crypto exchange computing device that interfaces with the pre-staging computing device to set a fiat currency value on a portion of the cryptocurrency stored in the crypto wallet;

a bank computing device coupled to an account custody database that is configured to communicate with the crypto exchange computing device to establish an owner of the crypto wallet and comparing the owner to the account custody database; and wherein if a match is found, providing the bank computing device with authority to distribute a set of fiat currency funds equivalent to the portion of the cryptocurrency to be exchanged.

Another exemplary embodiment relates to a system and method for initiating a transaction of cryptocurrency as stored in a decentralized electronic ledger such as a blockchain, and accessed through a crypto wallet of a customer, for conversion to fiat currency. In one embodiment, prestaging a transaction of physical cash to be retrieved by the customer or a third party, for example, at an ATM or electronic cash register at a POS system. In another embodiment, initiating the cash transaction in a mobile wallet app, identifying an ATM or POS system location by a QR-Code, and having the customer retrieve the physical currency immediately, while the steps of exchanging the cryptocurrency, available in the mobile wallet, to fiat currency via blockchain transaction and electronic-funds-transfer, take place subsequently. In an alternative embodiment, to prestage a deposit transaction of physical cash at an ATM or POS cash register, to be converted to cryptocurrency and stored in a decentralized ledger allowing for retrieval with the crypto wallet of the customer.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for receiving, means for sending, means for signaling, means for selecting, means for correlating, means for evaluating, means for assigning, means for allocating, means for removing, means for summing, means for scaling, means calculating, means for averaging, and/or means for taking action, may include one or more processors, transmitters, receivers, and/or other elements of the components illustrated in the figures.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A cash-cryptocurrency gateway, comprising:

a computing device comprising a processor and a memory;

a wallet application programming interface (wallet API) executing on the computing device and communicating over a network with a crypto wallet app of a crypto wallet provider, wherein the crypto wallet app provides access to a crypto wallet engine and public and private keys of a user to access cryptocurrency funds; and an electronic funds transfer gateway API (EFT gateway API) executing on the computing device and communicating over the network with an EFT gateway or financial institution; and wherein the computing device is configured to:

perform, via the wallet API and EFT gateway API, a cash-to-cryptocurrency transaction using the crypto wallet app, a crypto exchange service, and the EFT gateway or financial institution to deposit fiat currency at an automated teller machine (ATM) or a point-of-sale (POS) system with a pre-staging of the cash-to-cryptocurrency transaction, wherein performing the cash-to-cryptocurrency transaction with the pre-staging comprises:

receiving, via the wallet API and from the crypto wallet app on a user computing device used by the user, an indication of a fiat currency amount for deposit by the user via the ATM or POS system and a cryptocurrency transaction to deposit user cryptocurrency funds in a crypto wallet of the user associated with the crypto wallet app;

transmitting, in response to receiving the indication of the fiat currency amount for deposit, the cryptocurrency transaction to the crypto exchange service or to at least one blockchain node for exchange conversion of the fiat currency amount to the user cryptocurrency funds;

transmitting, in response to deposit of the fiat currency amount at the ATM or POS system by the user, a notification that the deposit has occurred via the EFT gateway API to the EFT gateway or financial institution thereby causing the EFT gateway or financial institution to deposit the fiat currency or an equivalent stablecoin amount in an intermediate account;

transmitting, via the EFT gateway API, the notification to the crypto exchange service;

receiving, from the crypto exchange service, in response to receiving the notification, a transfer indication that the exchange conversion of the fiat currency or stablecoin amount to the user cryptocurrency funds has occurred;

wherein identifying the user for the deposit through a financial-transaction code or token issued during the pre-staging comprises, after receiving the indication of the fiat currency or stablecoin amount for deposit:

generating the financial-transaction code or token for the deposit of the fiat currency amount at the ATM or POS system;

transmitting, to an ATM or POS system server, the financial-transaction code or token; and transmitting, to the user computing device via the wallet API, the financial-transaction code or token to signal the user that the fiat currency amount is ready for the deposit at the ATM or POS system.

2. The cash-cryptocurrency gateway of claim 1, wherein the cash-cryptocurrency gateway further comprises a crypto exchange API, wherein transmitting the cryptocurrency transaction to the crypto exchange service is via the crypto exchange API, for the exchange conversion of the user fiat currency or stablecoin amount to the cryptocurrency amount.

3. The cash-cryptocurrency gateway of claim 1, wherein the cash-cryptocurrency gateway further comprises a blockchain interface, wherein the cryptocurrency transaction is signed by the crypto wallet engine, wherein the cash-cryptocurrency gateway is further configured to transmit, via the blockchain interface, the signed cryptocurrency transaction to the at least one blockchain node.

4. The cash-cryptocurrency gateway of claim 1, wherein the cash-cryptocurrency gateway is implemented as a service on a computing device.

5. The cash-cryptocurrency gateway of claim 1, wherein the cash-cryptocurrency gateway is implemented using one or more smart contracts on a distributed ledger system.

6. The cash-cryptocurrency gateway of claim 1, wherein the cryptocurrency transaction is transmitted to the crypto exchange service via a crypto exchange API, for conversion of the fiat currency or stablecoin amount to the user cryptocurrency funds.

7. The cash-cryptocurrency gateway of claim 1, wherein the crypto wallet engine holds the public and private keys of a user to access cryptocurrency funds.

8. A method of operating a cash-cryptocurrency gateway, the method comprising:

communicating, by a computing device of the cryptocurrency-cash gateway over a network, with a crypto wallet app of a crypto wallet provider via a wallet application programing interface (wallet API) operated by the computing device, wherein the crypto wallet app provides access to a crypto wallet engine and public and private keys of a user to access cryptocurrency funds;

communicating, by the computing device, over the network via an electronic funds transfer gateway API (EFT gateway API) executing on the computing device and communicating over the network with an EFT gateway or financial institution;

performing, by the computing device via the wallet API and the EFT gateway API, a cash-to-cryptocurrency transaction using the crypto wallet app, a crypto exchange service, and the EFT gateway or financial institution to deposit fiat currency cash at an automated teller machine (ATM) or a point-of sale (POS) system with a pre-staging of the cash-to-cryptocurrency transaction, wherein performing the cash-to-cryptocurrency transaction with the pre-staging comprises:

receiving, via the wallet API and from the crypto wallet app on a user computing device used by the user, an indication of a fiat currency amount for deposit by the user via the ATM or POS system and a cryptocurrency transaction to deposit user cryptocurrency funds in a crypto wallet of the user associated with the crypto wallet app;

transmitting, in response to receiving the indication of the fiat currency amount for deposit, the cryptocurrency transaction to the crypto exchange service or to at least one blockchain node for exchange conversion of the fiat currency or an equivalent stablecoin amount to the user cryptocurrency funds;

transmitting, in response to deposit of the fiat currency or stablecoin amount at the ATM or POS system by the user, a notification that the deposit has occurred via the EFT gateway API to the EFT gateway or financial institution thereby causing the EFT gateway or financial institution to deposit the fiat currency or stablecoin amount in an intermediate account;

transmitting, via the EFT gateway API, the notification to the crypto exchange service;

receiving, from the crypto exchange service, in response to receiving the notification, a transfer indication that the exchange conversion of the fiat currency or stablecoin amount to the user cryptocurrency funds has occurred; and identifying the user for the deposit through a financial-transaction code or token issued during the pre-staging, wherein identifying the user comprises, after receiving the indication of the fiat currency amount for deposit:

generating the financial-transaction code or token for the deposit of the fiat currency amount at the ATM or POS system;

transmitting, to an ATM or POS system server, the financial-transaction code or token; and transmitting, to the user computing device via the wallet API, the financial-transaction code or token to signal the user that the fiat currency amount is ready for the deposit at the ATM or POS system.

9. The method of claim 8, wherein transmitting the cryptocurrency transaction to the crypto exchange service is via a crypto exchange API, for the exchange conversion of the fiat currency or stablecoin amount to the user cryptocurrency funds.

10. The method of claim 8, wherein the cryptocurrency transaction is signed by the crypto wallet engine, wherein the method further comprises transmitting, by the cash-cryptocurrency gateway via a blockchain interface, the signed cryptocurrency transaction to the at least one blockchain node.

11. The method of claim 8, further comprising communicating, by the computing device via a blockchain interface, over a network with at least one blockchain node, wherein the cryptocurrency transaction is signed by the crypto wallet engine, wherein the method further comprises transmitting, via the blockchain interface, the signed cryptocurrency transaction to the at least one blockchain node.

12. The method of claim 8, wherein the cash-cryptocurrency gateway is implemented as a service on a computing device.

13. The method of claim 8, wherein the cash-cryptocurrency gateway is implemented using one or more smart contracts on a distributed ledger system.

14. The method of claim 8, wherein the crypto wallet engine holds the public and private keys of a user to access cryptocurrency funds.

15. A cryptocurrency-cash gateway, comprising:

a computing device comprising a processor and a memory;

a wallet application programming interface (wallet API) executing on the computing device and communicating over a network with a crypto wallet app of a crypto wallet provider, wherein the crypto wallet app provides access to a crypto wallet engine and public and private keys of a user to access cryptocurrency funds; and an electronic funds transfer gateway API (EFT gateway API) executing on the computing device and communicating over the network with an EFT gateway or financial institution; and wherein the computing device is configured to:

perform, via the wallet API and EFT gateway API, a cryptocurrency-to-cash transaction using the crypto wallet app, a crypto exchange service, and the EFT gateway or financial institution to withdraw fiat currency cash at an automated teller machine (ATM) or a point-of-sale (POS) system with a pre-staging of the cryptocurrency-to-cash transaction, wherein performing the cryptocurrency-to-cash transaction with the pre-staging comprises:

receiving, via the wallet API and from the crypto wallet app on a user computing device used by the user, an indication of a fiat currency amount for withdrawal by the user via the ATM or POS system and a cryptocurrency transaction, wherein receiving the indication comprises checking that available balance from conversion of user cryptocurrency funds associated with the cryptocurrency transaction to the fiat currency amount is sufficient;

transmitting, in response to receiving the indication of the fiat currency amount for withdrawal, the cryptocurrency transaction to the crypto exchange service or to at least one blockchain node for exchange conversion of the user cryptocurrency funds to the fiat currency or an equivalent stablecoin amount;

receiving, from the crypto exchange service, in response to transmitting the cryptocurrency transaction, a transfer indication that the exchange conversion of the user cryptocurrency funds to the fiat currency or stablecoin amount has occurred;

transmitting, in response to receiving the transfer indication, the transfer indication via the EFT gateway API to the EFT gateway or financial institution thereby causing the EFT gateway or financial institution to deposit the fiat currency or stablecoin amount in an intermediate account;

receiving, from the EFT gateway or financial institution, a notification that the fiat currency or stablecoin amount has been deposited in the intermediate account;

after receiving from the EFT gateway or financial institution the notification that the fiat currency or stablecoin amount has been deposited in the intermediate account, generating a financial-transaction code or token for the withdrawal of the fiat currency amount at the ATM or POS system; and transmitting, to an ATM or POS system server, the financial-transaction code or token;

transmitting, to the user computing device via the wallet API, the financial-transaction code or token to signal the user that the fiat currency amount is ready for the withdrawal at the ATM or POS system;

wherein the financial-transaction code or token is displayed on the user computing device to withdraw the fiat currency amount at the ATM or POS system to receive the fiat currency amount being dispensed by the ATM or POS system.

16. The cryptocurrency-cash gateway of claim 15, wherein the cryptocurrency-cash gateway further comprises a crypto exchange API, wherein transmitting the cryptocurrency transaction to the crypto exchange service is via the crypto exchange API, for the exchange conversion of the user cryptocurrency funds to the fiat currency or stablecoin amount.

17. The cryptocurrency-cash gateway of claim 15, the cryptocurrency-cash gateway further comprises a blockchain interface for communicating over the network with at least one blockchain node, wherein the cryptocurrency transaction is signed by the crypto wallet engine, wherein the cryptocurrency-cash gateway is further configured to transmit, via the blockchain interface, the signed cryptocurrency transaction to the at least one blockchain node.

18. The cryptocurrency-cash gateway of claim 15, wherein the crypto wallet engine holds the public and private keys of a user to access cryptocurrency funds.

* * * * *